US008373291B2

(12) United States Patent
Zeumer et al.

(10) Patent No.: US 8,373,291 B2

(45) Date of Patent: Feb. 12, 2013

(54) WIND PARK WITH VOLTAGE REGULATION OF THE WIND ENERGY SYSTEMS AND OPERATING METHOD

(75) Inventors: Jorg Zeumer, Rendsburg (DE); Heinz-Hermann Letas, Süsel (DE); Jens Fortmann, Berlin (DE)

(73) Assignee: REpower Systems AG, Hamburg (DE)

( * ) Notice: Subject to any disclaimer, the term of this patent is extended or adjusted under 35 U.S.C. 154(b) by 385 days.

(21) Appl. No.: 12/679,206

(22) PCT Filed: Sep. 4, 2008

(86) PCT No.: PCT/EP2008/007246

§ 371 (c)(1), (2), (4) Date: Mar. 19, 2010

(87) PCT Pub. No.: WO2009/036895

PCT Pub. Date: Mar. 26, 2009

(65) Prior Publication Data

US 2010/0312409 A1 Dec. 9, 2010

(30) Foreign Application Priority Data

Sep. 19, 2007 (DE) ........................ 10 2007 044 601

(51) Int. Cl.
*F03D 9/00* (2006.01)

(52) U.S. Cl. ........................................... 290/44; 290/55

(58) Field of Classification Search .................... 290/44, 290/55

See application file for complete search history.

(56) References Cited

U.S. PATENT DOCUMENTS 7,571,013 B2 * 8/2009 Altemark ........................ 290/44
7,573,160 B2 * 8/2009 Cardinal et al. .............. 307/153
7,606,638 B2 10/2009 Fortmann et al.

FOREIGN PATENT DOCUMENTS

| | | |
|---|---|---|
| DE | 102004048341 | 4/2006 |
| EP | 1512869 | 3/2005 |
| WO | WO-01/73518 | 10/2001 |

OTHER PUBLICATIONS

International Search Report including Written Opinion mailed Sep. 22, 2009, directed at counterpart International Application No. PCT/EP2008/007246; 5 pages.

M. Prodanovic et al. (2006). "High-Quality Power Generation Through Distributed Control of a Power Park Microgrid." *IEEE Transactions on Industrial Electronics*, 53(5): 1471-1482.

* cited by examiner

*Primary Examiner* — Tho D Ta

(74) *Attorney, Agent, or Firm* — Morrison & Foerster LLP

(57) ABSTRACT

A wind park and operating method thereof. The wind park includes at least two wind energy systems each comprising a generator and converter for generating electrical energy and a control system, a park master designed for active and idle power control that transmits a control signal for idle power via a communications network to the wind energy systems, and a connection network feeding generated electrical energy into a grid. The wind energy system can include an idle power regulator and a supplementary regulator, the control signals of each of which are linked together. Thus, a combination of idle power and voltage regulation is achieved that combines the advantages of each. Accordingly, the wind park can have high dynamic and stability notwithstanding erratic changes in the grid.

17 Claims, 3 Drawing Sheets

WIND PARK WITH VOLTAGE REGULATION OF THE WIND ENERGY SYSTEMS AND OPERATING METHOD

REFERENCE TO RELATED APPLICATIONS

This application is a national stage application under 35 USC 371 of International Application No. PCT/EP2008/007246, filed Sep. 4, 2008, which claims the priority of German Patent Application No. 10 2007 044 601.4, filed Sep. 19, 2007, the contents of which prior applications are incorporated herein by reference.

FIELD OF THE INVENTION

The invention relates to a wind farm having at least one wind energy installation, which each have a generator and a converter, and having a farm master which is designed for real power and wattless-component monitoring and transmits a control signal for the wattless component via a communication network to the wind energy installations, and having a connection grid system which connects the wind energy installations to one another in order to feed electrical power into a grid system via a junction point.

BACKGROUND OF THE INVENTION

The behavior of wind farms when connected to the electrical grid system is becoming increasingly important for operation of wind farms. Because of the increasing number and size of the wind farms, they can and must make their contribution to ensuring the stability of the grid system. The important factors from the point of view of the grid system operators are not only the compensated feeding of real power, but there are additionally also requirements relating to the feeding of wattless component, in order to make it possible to comply with specific tolerance limits for the emitted voltage. The latter is particularly important in the case of wind farms which are connected to the medium-voltage grid system. This is because, in these grid systems, changes in the voltage level of individual points, such as the feed point of a large wind farm, due to the network structure, can lead to influences on the primary routes and directions in which the electrical power flows. It is also known for it to be highly important to feed in wattless components in order to support the voltage level. This is the case in particular in the event of a voltage dip.

The capability of wind farms with modern wind energy installations fitted with converters to feed both real power and a wattless component is therefore of major importance. One requirement is that specific nominal-value requirements must be complied with for the wattless component (irrespective of whether this relates to a direct requirement for the wattless component or the power factor), and frequently for the nominal voltage as well, with respect to a junction point between the wind farm and the grid system. The farm master uses these nominal value requirements to determine appropriate control signals for the individual wind energy installations in the wind farm. In doing so, it is necessary to remember that the wind energy installations in a wind farm do not necessarily all need to be identical, and that, particularly in spatially extended wind farms, they are frequently also connected via long lines with different capacitance and resistance characteristics. In order to counteract the delay effect associated with this, attempts have been made to transmit requirements for the voltage to be emitted by the wind energy installations, rather than wattless-component nominal values, to the wind energy installations, in which case the wind energy installations regulate this in accordance with the requirement by means of a local voltage regulator (DE-A-102004048339). This concept offers the advantage of rapid transmission, even when the transmission speed in the communication network is limited. However, it has disadvantageously been found that implementation can be difficult, particularly in the case of wind farms having wind energy installations of a different type or from different manufacturers. This applies in particular to retrofitting. It is also known for a dedicated wattless-component nominal value to be preset for each of the individual wind energy installations (WO-A-01/73518). One disadvantage of this concept is that, when the wattless component (or the power factor or the angle) of the individual wind energy installations is preset directly by the farm master, the limited transmission speeds in the communication network for the wind farm can result in delays, leading to delayed readjustment and thus to a poor response to rapid changes.

SUMMARY OF THE INVENTION

In the light of the last-mentioned prior art, the invention is based on the object of providing an improved power-factor management which achieves a better dynamic response and therefore more stability in the grid system.

The inventive solution lies in the features broadly disclosed herein. Advantageous embodiments are specified in the detailed disclosure.

In the case of a method for operation of a wind farm having at least two wind energy installations, which has a generator with a converter for production of electrical power and has a controller, having a farm master which is designed for real-power and wattless-component monitoring, and transmits a control signal for the wattless component via a communication network to the wind energy installations, and having a connection grid system which connects the wind energy installations to one another in order to feed the electrical power produced into a grid system via a junction point, wherein the wattless component is regulated at least one of the wind energy installations by means of a power-factor regulator to whose input a wattless-component nominal value is applied and which acts on the converter in order to set a wattless component, there is provided, according to the invention, application of a signal to the at least one wind energy installation, and regulation of the emitted voltage by varying the wattless component emitted from the converter at the nominal voltage by means of an additional regulator, and furthermore linking of the power-factor regulator and the additional regulator such that a common control signal is formed for the converter.

The expression real-power or wattless regulator should be understood in a wide sense, and in addition to real power regulation devices it also covers current regulation devices which appropriately regulate the real component and the reactive component of the current, and therefore also the emitted power. It is therefore irrelevant to the invention whether the current or the power, or both in a mixed form, is or are used to regulate the real component and the reactive component.

The combination, as provided according to the invention, of a dedicated power-factor regulator in the wind energy installation and local voltage regulation achieves a better response of the wind energy installations in the wind farm, to be precise particularly with respect to the dynamic response to changes. This improvement allows faster regulation in the wind farm and makes it possible to avoid oscillations, such as those which, conventionally, have occurred frequently in the case of wind farms with different types of wind energy installations. In this case, the response can be influenced in a simple manner (in general by a simple software change) by the choice of the way in which the power-factor regulation and the additional regulation are linked. The interaction according to the invention of the power-factor regulator and the additional regulator by linking them therefore results in a rapid dynamic response, that is to say a fast reaction to voltage changes, and good stability, that is to say steady-state accuracy without the risk of regulation oscillations. For finer tuning, it is possible to provide for the power-factor regulation to have the dominant influence in the linking process. This reinforces the damping influence on regulation oscillations between the wind energy installations, as a result of which these virtually disappear. In contrast, if the additional regulation of the voltage is dominant in the linking process, then a faster response can be achieved when the voltage changes occur.

The interaction according to the invention will be explained in the following text using the example of a voltage dip. The voltage reduction in the grid system is identified virtually at the same time by the farm master and the control system for the individual wind energy installations. The farm master uses its wattless-component monitoring unit to calculate a new wattless-component nominal value on the basis of the changed voltage value. Because of the signal delay, which unavoidably occurs because of the limited bandwidth, in the transmission of the changed nominal value to the wind energy installations (this value is in practice several hundred milliseconds), the changed nominal values arrive at the power-factor regulator for the wind energy installations with a considerable delay. Since the additional regulator in the wind energy installation likewise identifies the voltage dip, there is no need to wait for the delayed transmission of new nominal values, and instead the required change in the wattless-component output can be anticipated at this stage. When the new nominal values arrive from the farm master, the linking process according to the invention to the power-factor regulator ensures that sufficient steady-state accuracy is achieved. In this case, the wattless-component monitoring unit that is implemented in the farm master adapts the nominal requirements for the wind energy installations such that the total wattless component being produced by the farm at that time matches the nominal requirement. This process can be carried out slowly and therefore with high steady-state accuracy, since the wind energy installations in which the additional regulator and the power-factor regulator are linked can autonomously anticipate the required reaction.

Furthermore, in addition to the rapid regulation of the control differences while at the same time avoiding control oscillations, the method according to the invention allows flexible matching to the requirements of different grid system operators. For example, the method can easily be implemented in such a way that, rather than presetting a wattless component for the wind farm as an entity, a nominal voltage for the wind farm can be used as an entity for control purposes. Furthermore, the method according to the invention offers the advantage that it can be implemented with comparatively minor modifications in software-based control systems and farm masters. Only a small amount of additional hardware complexity is required.

The signals of the power-factor regulator and of the additional regulator can be linked by means of variable weighting factors. This makes it possible to influence the interaction between the additional regulator and the power-factor regulator. Various operating methods are possible. For example, it is possible for the farm master to preset not only the signal for the nominal voltage for the additional regulator but also for the wattless-component nominal value for the power-factor regulator. This allows very flexible overall optimization of the response of the wind energy installations in the wind farm, and therefore of the wind farm with respect to the grid system. However, for simplicity, it is also possible to provide for one of the two nominal values to in each case be set at the wind energy installation, and for the other to in each case be preset dynamically by the farm master. For example, if provision is made for the wattless-component nominal value to be constant, the farm master passes the signal for the nominal voltage to the additional regulator for the wind energy installation. This allows very rapid voltage regulation and therefore achieves effective stabilization of the grid-system voltage. Furthermore, this makes it possible to avoid undesirable excessive voltage increases by individual wind energy installations. This therefore allows the losses in the wind farm to be optimized overall. In this case, there is no need to preset a fixed wattless component for all of the wind energy installations, but expediently only for some of the wind energy installations in the farm. However, alternatively, it is also possible to provide a fixed setting for the nominal voltage at the wind energy installations, while the wattless-component nominal value is preset dynamically by the farm master. This also allows sufficiently rapid reaction to voltage changes, to be precise in particular also in conjunction with wind energy installations in the wind farm which do not have local voltage regulation. This method according to the invention can therefore be carried out very flexibly in various ways. Furthermore, it is robust to wind farms with wind energy installations of different types, which do not have specific functionalities, such as voltage regulation, or have different additional functionalities, such as additional passive compensation. The method according to the invention can therefore be used successfully even in those wind farms which have wind energy installations for which it is not possible to preset either the nominal voltage or the wattless component. The method according to the invention is therefore even suitable for wind farms which cannot be included in the regulation process because of a widely extended connection grid system or difficulties in the communication network of individual installations.

In one proven embodiment, the linking is carried out by varying the wattless component in the wind energy installation linearly with the voltage, provided that the voltage is within a voltage tolerance band. Provision is preferably also made for the wattless component to be varied non-linearly outside the limits of the tolerance band, for example by means of a kink in a characteristic at the limits of the tolerance band. This therefore allows the response of the method according to the invention to be varied within and outside the tolerance band, between the wattless-component preset on the one hand and the voltage regulation on the other hand.

In this case, the linking process is influenced predominantly by the additional regulator, and the wattless component of the wind energy installation will follow a voltage change, corresponding to the characteristics of the additional regulator. In this case, the additional regulator may be not only a proportional regulator but may also have integral and/or differential components.

The linking process can advantageously be carried out by input filtering of the input variable for the power-factor regulator or the additional regulator. In particular, it is possible to connect the additional regulator upstream of the power-factor regulator, as a result of which an output signal from the voltage regulator is applied as one of the input signals to the power-factor regulator. This makes it possible to achieve a clear regulator structure. This structure allows non-linear input filtering, for example by means of a characteristic element as an input filter.

In order to improve the overall voltage stability of the wind farm, the voltage emitted from the wind farm can be regulated at a nominal value by means of a voltage control module which acts on the wattless-component monitoring unit of the farm master. A nominal value for the nominal voltage of the farm is applied as an input thereto, and its output signal is applied as an input signal to the wattless-component monitoring unit. This makes it possible to base the operation of the wind farm on a voltage nominal value (preset by the grid system operator) rather than wattless-component nominal values. A reactive-current compensator can advantageously be used as a voltage control module and, in the simplest case, may be in the form of a characteristic element. Provision is preferably also made for a pilot control signal for the nominal voltage to be produced as a function of the actual voltage at the wind farm in order to compensate for the voltage changes produced by the additional regulators for the wind energy installations. This makes it possible to use the pilot control to largely compensate in the farm master for the risk of overshoots when the grid system voltage changes because of the influence of the local voltage regulation of the wind energy installation. The fundamental idea is simply to correct the wattless-component nominal values transmitted to the wind energy installations by the contribution to be expected from the local voltage regulation. This therefore considerably improves the dynamic response to voltage changes, in particular voltage dips.

An emergency controller is preferably used in the control system for the wind energy installation, which is designed to provide a preferably stored substitute value for the power-factor regulator when there is no signal for the wattless-component nominal value. This makes it possible to maintain a certain amount of power-factor regulation in the wind energy installation, even in the event of failure of the communication, for example as a result of a fault in the communication network, to be precise at a standard value stored in advance.

The invention relates to a wind energy installation which has a generator with a converter for production of electrical power, and has a controller with a connection for a communication network, via which a control signal for the wattless component is applied to the wind energy installation, and has an additional regulator to whose input a signal for a nominal voltage is applied and which emits control signals for the converter in order to vary the emitted wattless component, in order to regulate the emitted voltage from the wind energy installation at the nominal value, wherein, according to the invention, the wind energy installation has a power-factor regulator to whose input a wattless-component nominal value is applied, and which acts on the converter in order to set a wattless component which corresponds to the wattless-component nominal value, and wherein a logic unit is provided which connects the power-factor regulator and the additional regulator to one another such that a common control signal is formed for the converter.

The invention furthermore relates to a wind farm having at least two wind energy installations, which have a generator with a converter for production of electrical power and has a controller, having a farm master which is designed for real-power and wattless-component monitoring, and transmits a control signal for the wattless component via a communication network to the wind energy installations, and having a connection grid system which connects the wind energy installations to one another in order to feed the electrical power produced into a grid system via a junction point, wherein at least one of the wind energy installations has a power-factor regulator to whose input a wattless-component nominal value is applied and which acts on the converter in order to set a wattless component which corresponds to the wattless-component nominal value, wherein, according to the invention, the wind energy installation has an additional regulator to whose input a signal for a nominal voltage is applied, and which emits control signals for the converter in order to vary the emitted wattless component, in order to regulate the emitted voltage from the wind energy installation at the nominal value, wherein a logic unit is provided, which connects the power-factor regulator and the additional regulator to one another such that a common control signal is formed for the converter.

For a more detailed explanation, reference is made to the above statements relating to the method.

BRIEF DESCRIPTION OF THE DRAWINGS

The invention will be explained in more detail in the following text with reference to the attached drawings, which illustrate advantageous exemplary embodiments, and in which.

DETAILED DESCRIPTION OF THE INVENTION

Figure 1:
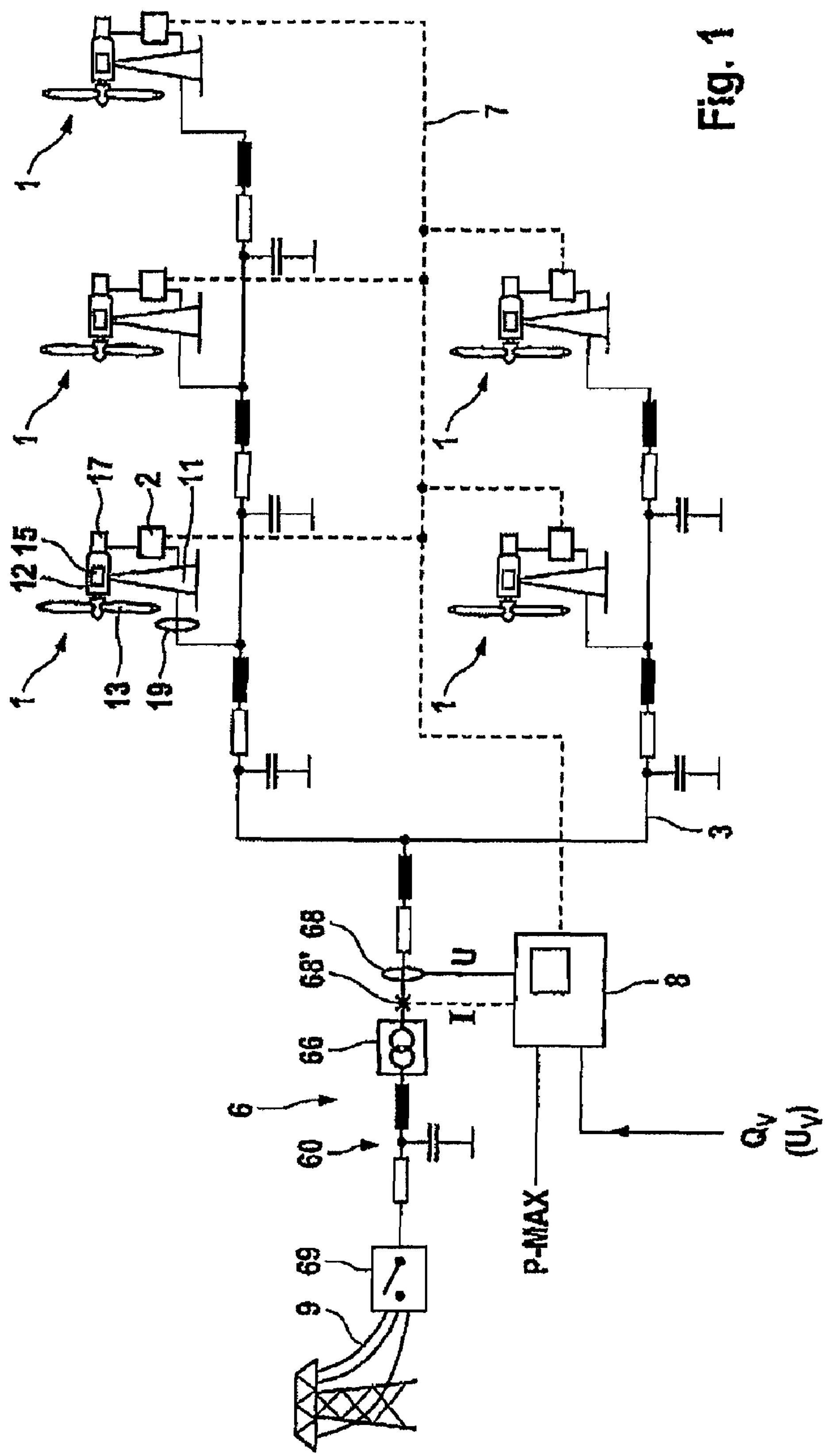
FIG. 1: shows a schematic view of one exemplary embodiment of a wind farm according to the invention, having a farm master and wind energy installations.

According to one embodiment of the invention, a wind farm comprises a plurality of wind energy installations 1 (by way of example, FIG. 1 shows five wind energy installations), a connection grid system 3 to which the wind energy installations 1 are connected and which is connected via a junction point 69 to a medium-voltage grid system 9, a farm master 8 for central control of the wind farm and a communication network 7, which connects the farm master 8 to the individual wind energy installations 1.

The individual wind energy installations 1 have a tower 11 at whose upper end a machine house 12 is arranged such that it can rotate in the azimuth direction. On its front end face, a rotor 13 is attached such that it can rotate to a rotor shaft (not illustrated), via which the rotor 13 drives a generator 15 in the machine house 12. This is preferably a double-fed asynchronous generator, although other types are also possible. A converter 17 is connected to the generator 15 and converts the electrical power at a variable frequency, as produced by the generator, to a three-phase current at a fixed frequency (grid system frequency). The wind energy installation 1 is monitored by a controller 2, which acts on the individual components of the wind energy installation 1 via suitable control lines (not illustrated). The communication network 7 is connected to the controller 2.

The farm master 8 is provided to monitor the electrical power fed into the grid system 9 and carries out a control function for the wind energy installations 1. The electrical power produced by the wind energy installations 1 is fed into the distribution grid system 3 and is passed via this to a connection line 6, via which it is passed to the junction point 69 and further into the grid system 9. The connection line 6 may have a considerable length and may therefore have resistances, inductances and capacitances which are not negligible. These are illustrated symbolically in FIG. 1 as concentrated elements 60 along the connection line 6. The connection line 6 has a medium-voltage trans-former 66 which is designed to increase the voltage level in the distribution grid system 3 from about 1000 volts to the voltage level of the medium-voltage grid system 9 of about 20 kV. Furthermore, pick-ups for voltage and current 68, 68' are arranged along the connection line 6, and their measurement signals are connected to the farm master 8.

Figure 3:
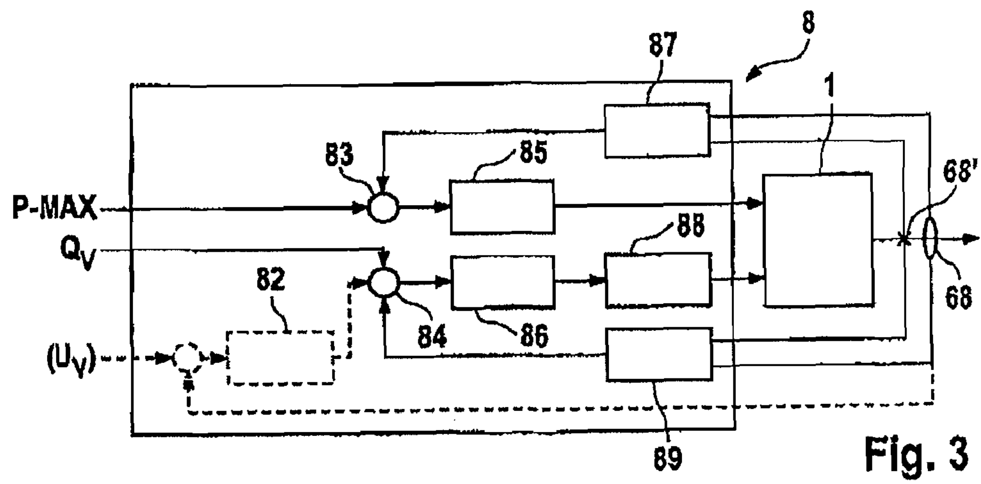
FIG. 3: shows a schematic illustration of a farm master according to a first exemplary embodiment of the invention.

In addition to inputs of the voltage and current measurement signals mentioned above, relating to the power fed from the wind farm into the grid system 9, the farm master 8 has inputs for the maximum real power P-MAX that can be fed in and for a preset wattless component for the power to be fed in. The term "wattless-component preset" should be understood in a general form and, in addition to a wattless-component value Qv includes the power factor cos $\phi$, tan $\phi$, the angle $\phi$ itself or else a preset voltage Uv. The farm master 8 has a real-power branch with a subtraction element 83 and a real-power monitoring unit 85 (FIG. 3). The input signal, which is supplied from the outside, for a maximum real power is applied to a positive input of the subtraction element 83. An output signal from a real-power calculation unit 87 is applied to the other, negative input of the subtraction element 83, and the measurement signals determined by the current and voltage pick-ups 68, 68' are connected to the real-power calculation unit 87 as input signals. The real-power calculation unit 87 determines the real power actually emitted from the wind farm, and this is compared by the subtraction element 83 with the intended maximum power P-Max, and the difference resulting from this is applied as an input signal to the real-power monitoring unit 85. A limit function is implemented in the real-power monitoring unit 85 and emits a real-power limiting signal $P_{max}$ to the wind energy installations 1 in the wind farm if the actually emitted real power exceeds the intended maximum power.

The farm master 8 furthermore has a wattless-component branch with a subtraction element 84 and a wattless-component monitoring unit 88. An external nominal signal for the wattless-component preset Qv is applied to a first, positive input of the subtraction element 84. A wattless-component calculation unit 89 is connected to the negative input of the subtraction element 84 and uses the voltage and current measurement signals determined by the measurement pick-ups 68, 68' to calculate the value of the wattless component Q actually emitted from the wind farm. The subtraction element 84 determines the difference between the wattless component actually fed in and the applied preset value, and supplies the difference, after limiting by a limiting module 86, to the wattless-component monitoring unit 88. This is designed to use the difference between the emitted wattless component and the intended nominal value to in each case produce updated control signals for the individual wind energy installations 1 in the wind farm, to be precise for their controllers 2. These control signals are used to vary the nominal operating point of the wind energy installations 1 such that any differences between the wattless power emitted from the wind farm and the preset value are regulated out. It should be noted that direct presetting of the nominal wattless component Qv is only one of a number of possibilities for regulating the wattless component. The process of presetting a nominal voltage is illustrated by way of example in FIG. 2. The conversion module 82 is in the form of a reactive-current compensator module in which a characteristic function is stored for determining a wattless-component preset Qv as a function of the preset voltage. This is preferably stored in the form of a look-up table.

Figure 4:
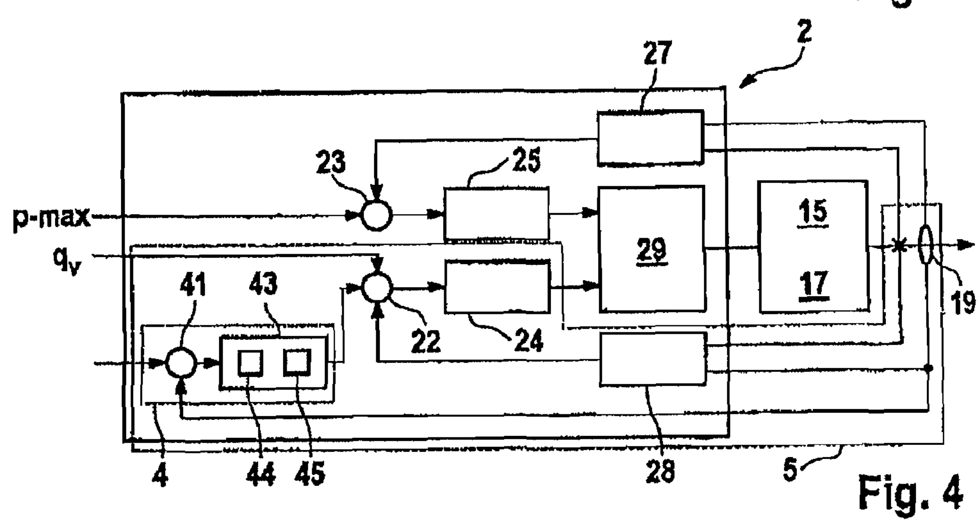
FIG. 4: shows a schematic illustration of a wind energy installation according to a first exemplary embodiment of the invention.

The design and operation of the controller 2 for a wind energy installation 1 will be explained with reference to the exemplary embodiment illustrated in FIG. 4. The main components of the controller 2 are a real-power regulator 25 and a power-factor regulator 24. A subtraction element 23 is connected to the input of the real-power regulator 25. The maximum level P-MAX, as determined by the farm master, for the real power of the respective wind energy installation is applied to the positive input of the subtraction element 23, and a measure of the real power actually emitted by the wind energy installation 1, as determined by a calculation unit 27, is applied to the negative input. This determines (in a manner corresponding to the calculation unit 87 in the farm master) the actually emitted real power on the basis of measurement signals which are measured by voltage and current sensors (not illustrated) on the connecting line of the wind energy installation 1 to the connection grid system 3. The subtraction element 23 uses the difference to determine any discrepancy, which is used as an input signal for the real-power regulator. The real-power regulator 25 uses a control algorithm which is known per se to determine a control signal for the wind energy installation, and this is supplied to a decoupling and limiting module 29.

The power-factor regulator 24 has a similar structure to that of the real-power regulator 25, and a subtraction element 22 is connected to its input. This subtraction element 22 forms the difference between the applied signals for a nominal wattless component qs, as determined by the wattless-component monitoring unit 88 in the farm master 8, and the actually emitted wattless component of the wind energy installation, as calculated by means of a wattless-component calculation unit 28. The difference between these forms a wattless-component discrepancy, which is applied as an input signal to the power-factor regulator 24. From this, this uses a control algorithm that is known per se to determine a control signal for the wind energy installation 1, which is likewise applied to the decoupling and limiting module 29. This is designed to use the control signals from the real-power regulator 25 and the power-factor regulator 24 to generate common reference signals for the converter 17 in the wind energy installation 1. These signals are applied as a reference vector F to the converter 17 and possibly also to the generator 15 in the wind energy installation.

The controller 2 designed according to the invention furthermore has an additional regulator 4, which has a subtraction element 41 at its input, and a control core 43. A measure for a nominal value of the voltage emitted by the wind energy installation 1 is applied to a positive input of the subtraction element 41; the measure of the actually emitted voltage, as determined by the voltage measurement device 19, is applied to the other, negative input of the subtraction element 41. The voltage difference which results in this case is applied as an input signal to the control core 43 of the additional regulator 4. This is designed to use the voltage difference to determine correction signals for the input of the power-factor regulator 24. In the illustrated exemplary embodiment, the control core 43 for this purpose has a switchable characteristic element 44, which has a family of different characteristics (two in the illustrated example) implemented in it, as well as a multiplication element 45. The choice between the characteristics can be made as required from the outside, by the farm master 8 or if required also automatically by the controller 2 of the wind energy installation 1.

Figure 5:
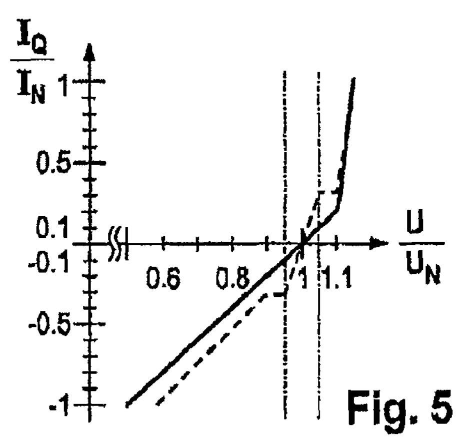
FIG. 5 shows illustrations of alternative characteristics for the exemplary embodiment shown in FIG. 4.

Reference is made to FIG. 5, which shows the family of two characteristics. The characteristic represented by means of a solid line will be explained first of all. This is subdivided into a plurality of sections: a first branch for a voltage difference of more than 10% of the rated voltage, an upper branch for a difference of more than +10% of the rated voltage, and a main area in the voltage band in between. The characteristic gradient in the main area is chosen such that a voltage difference of +10% or −10% results in a correction value for the reactive current to be fed in of +16% and −16%, respectively, of the rated current. A somewhat higher gradient of the characteristic is chosen in the lower branch, for which the nominal value for the reactive current changes by about 20% of the rated value for every 10% further voltage difference. In contrast, a very high gradient of the characteristic is implemented for protection against overvoltage in the upper branch of the characteristic, such that even a voltage difference of +15% results in the maximum possible reactive current (that is to say the rated current) being emitted. A nominal value for the wattless component is calculated from the reactive current determined in this way, by multiplication by the voltage, in the multiplication element 45. A characteristic such as this allows a good control rate to be achieved, which is particularly suitable for improving the response of the wind farm in its entirety with regard to the wattless-component preset, when voltage changes occur. These characteristics are particularly suitable for damping control oscillations between the wind energy installations in a wind farm with a wattless-component preset to the individual wind energy installations.

An alternative characteristic is represented by dashed lines in FIG. 5. This is subdivided into five sections: a lower branch, a lower plateau, a main area, an upper plateau and an upper branch. The main area extends over a narrower range than in the case of the characteristic explained first of all, specifically in a range from −5% to +5% of the nominal voltage. The gradient of the linear characteristic is considerably greater than in the case of the first variant, so that even a difference of 5% results in a 30% change in the magnitude of the reactive current. This value of 30% for the reactive current is also maintained in the subsequent plateau area of the characteristic, which extends from 5% to 10% difference, both in the case of undervoltage and in the case of overvoltage. This is followed for lower voltage by the lower branch of the characteristic, which has a gradient corresponding to the first variant, that is to say a change of about 20% in the reactive current for every 10% voltage difference. The upper branch once again has a considerably greater gradient, as a result of which, starting from a reactive current of 30% for an overvoltage of just 10%, the maximum reactive current (rated current) is reached at an overvoltage of +15%. The voltage regulation element is dominant in this characteristic. This is advantageous when particularly rapid voltage regulation is desirable in the wind farm, in order to reliably preclude negative effects of voltage changes.

According to a further aspect of the invention, the gradient of the characteristic in the main area can be chosen such that it corresponds to the characteristic gradient of the reactive-current compensation implemented in the farm master 8. This is achieved in that, when voltage changes occur, the individual wind energy installations can react autonomously and quickly to the voltage change by means of the additional regulator 4 by feeding in wattless component, while at the same time, in the course of the greater reaction time of the farm master 8, which is lengthened in particular by the communication time via the communication network 7, corrected nominal values for the individual wind energy installations are calculated by means of the reactive-current compensation of the farm master, as a result of which the local additional regulators 4 for the wind energy installations 1 are returned to their initial value again. A plurality of iteration cycles of the farm master 8 may be required for this purpose before a steady-state accuracy is achieved. However, this is not disturbing since the additional regulator 4 provided at the wind energy installations 1 ensures a rapid reaction and therefore a good dynamic response, overall.

As a result of such linking of the compensation in the farm master 8 to the additional regulator 4, the invention therefore achieves a considerable improvement in the response of the wind farm with respect to the wattless component in the event of voltage changes within and outside the intended tolerance band.

The additional regulator 4 and the power-factor regulator 24 are linked to one another by being connected in series. In this case, the additional regulator 4 acts as an input filter for the power-factor regulator 24, which uses its own reference variable (wattless-component nominal value) and the actuating signal of the additional regulator 4 to calculate a common output signal, which is transmitted with the reference factor to the wind energy installations 1. A logic unit 5 is therefore formed by the structure with the additional regulator 4, the subtraction element 22, the power-factor regulator 24 and feedback via the voltage pick-up 19 and subtraction element 41.

The wind energy installations 1 can in this case be operated in various ways. For example, in a first operating mode, as described above, both the nominal wattless component and the voltage of the individual wind energy installations 1 can be preset by the farm master 8. This is the fully linked operating mode and allows very flexible optimization of the response of the wind energy installations 1 in the wind farm and, in consequence, optimization of the response of the wind farm overall with respect to the grid system 9. Furthermore, presetting a nominal wattless component for the individual wind energy installations 1 offers the capability to also include any passive compensation devices which may be present there in the closed-loop control process.—For simplicity, however, other operating responses with restricted linking may also be provided. For example, in a second operating mode, the nominal voltage is still preset by the farm master 8, while a nominal wattless component is set at the wind energy installations. This operating mode offers the advantage of very rapid voltage regulation in order in this way to stabilize the emitted voltage and therefore, in the end, the voltage emitted overall from the wind farm to the grid system 9, as well. Furthermore, this allows optimization of the losses in the wind farm and makes it possible to avoid undesirable excessive voltage levels at individual wind energy installations 1, in particular those which are located at the end of long connecting lines in the connection grid system 3. In a wind farm having a plurality of wind energy installations, it is expedient for only some of the wind energy installations to have a constant wattless-component nominal value preset.—An alternative third operating mode is for the farm master 8 to preset the emitted nominal wattless component, while the nominal value for the emitted voltage is constant. An operating mode such as this may be expedient in wind farms which also have wind energy installations without local voltage regulation. This operating mode can therefore be used in particular for retrofitting.—Finally a fourth operating mode is also possible, in which both the nominal voltage and the wattless component are set at fixed nominal values. This also makes it possible to include wind energy installations 1 which are located at highly unfavorable points (long connecting lines and difficult connection via the communication network 7). The invention therefore offers the flexibility to be introduced into the overall control concept for the wind farm well even for highly problematic wind energy installations. In a situation such as this, the controller 2 can preferably be designed such that either the preset wattless component or the preset nominal voltage has priority. In the situation mentioned first, it is expedient to implement slow regulation in the controller 2, which internally slowly readjusts the wattless-component nominal value such that the additional regulator is returned to its initial value again when voltage changes occur.

Figure 2:
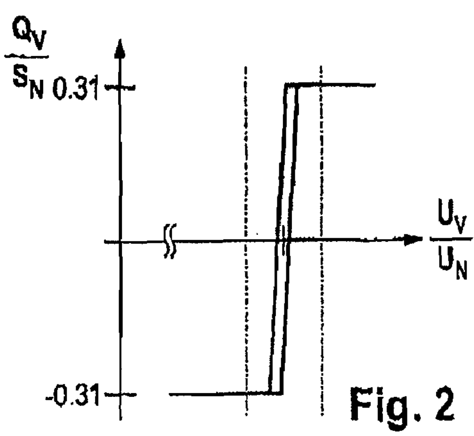
FIG. 2: shows one example of a request relating to the response of the wind farm to the grid system.
Figure 6:
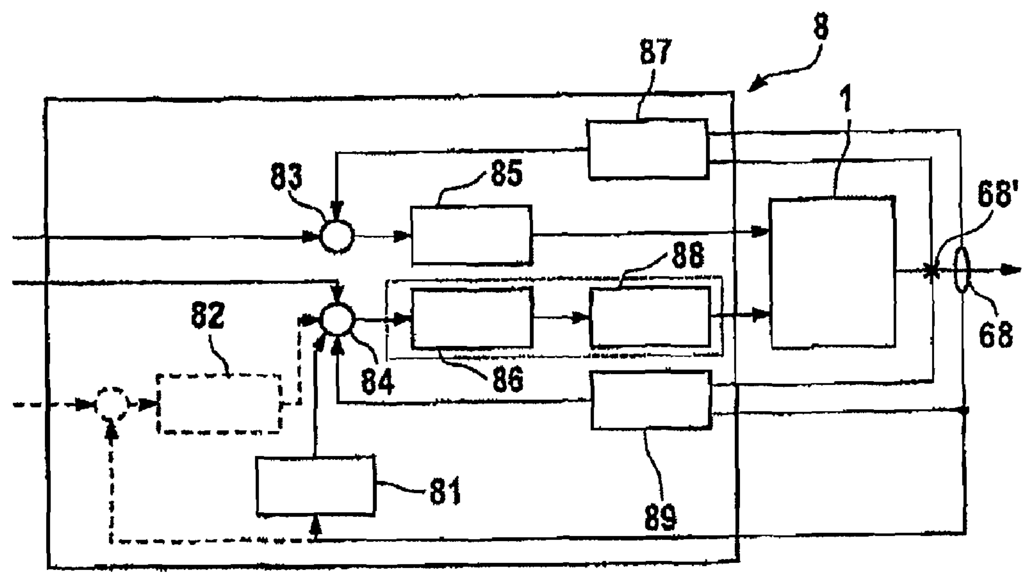
FIG. 6: shows a schematic illustration of a farm master according to a second exemplary embodiment of the invention.

FIG. 6 illustrates a second embodiment of the farm master which differs from the first embodiment illustrated in FIG. 2 essentially by the provision of an additional compensation module 80 for the voltage. A measured value for the voltage, as determined by means of the voltage pick-up 68, of the electrical power emitted by the wind farm into the grid system 9 is applied to one input of the compensation module 80. An output signal from the compensation module 80 is applied as a further negative input to the subtraction element 84 in the farm master 8. The compensation module 80 has a D-characteristic and is designed, as pilot control, to determine a compensation value in the event of voltage changes, which compensation value corresponds approximately to the influence of the reactive-current compensator in the farm master 8. The nominal wattless-component value transmitted to the individual wind energy installations 1 can therefore at this stage be corrected by the contribution of the local additional regulator 4. This considerably counteracts the risk of overshoots in the event of sudden voltage changes.

Figure 7:
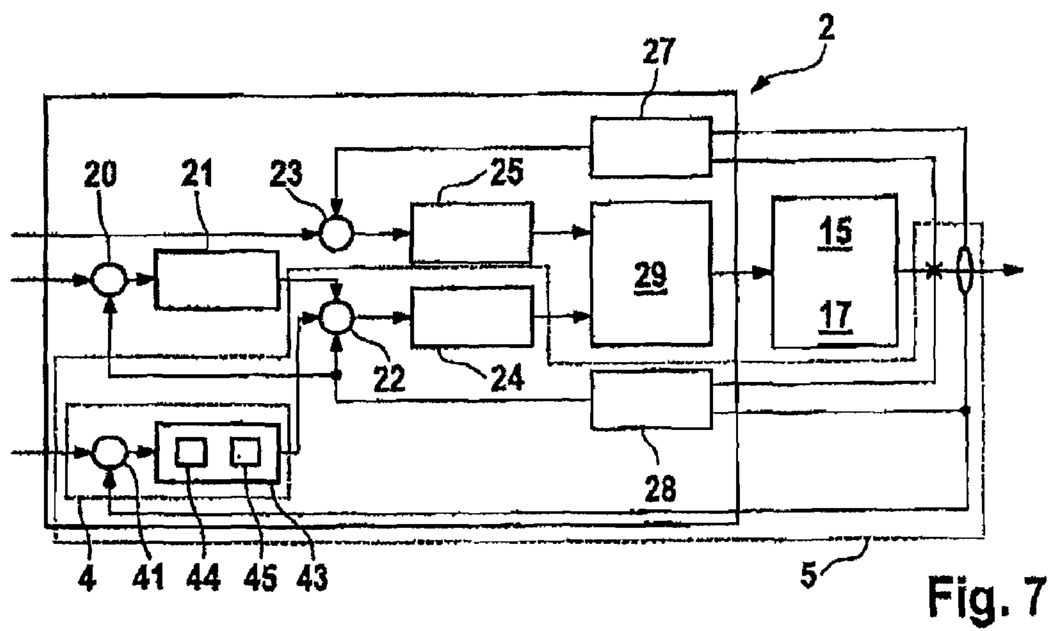
FIG. 7: shows a schematic illustration of a wind energy installation according to a second exemplary embodiment of the invention.

In the second exemplary embodiment of the wind energy installation, as illustrated in FIG. 7, an emergency control module 21 is provided in the controller 2, and is designed to provide a substitute value when there is no signal for the nominal wattless component. For this purpose, the output of the emergency control module 21 is applied to the subtraction element 22. In order to allow regulation by means of the emergency control module 21, it is preceded by a subtraction element 20 which determines the difference between the nominal wattless component, as determined by the farm master 8, and the nominal wattless component actually fed in, and applies this as an input signal to the emergency control module. Even if the communication network 7 fails, wattless-component regulation can therefore be carried out at the wind energy installation 1. Regulation is in this case carried out optionally at a stored standard value or at a mean value of the most recently transmitted nominal wattless-component values. The additional regulator 4 is preferably still active, for additional assistance.

The invention claimed is:

1. A wind farm comprising:

at least two wind energy installations, each comprising a generator with a converter for production of electrical power and a controller;

a farm master configured to provide real-power and wattless-component monitoring and configured to transmit a control signal for a wattless component via a communication network to the wind energy installations; and a connection grid system configured to connect the wind energy installations to one another to feed produced electrical power into a grid system via a junction point, wherein the controller comprises (i) a power-factor regulator to whose input a wattless-component nominal value is applied and which acts on the converter to set a wattless component which corresponds to the wattless-component nominal value, (ii) an additional regulator to whose input a signal for a nominal voltage is applied and which emits control signals for the converter to vary the emitted wattless component in order to regulate emitted voltage from the wind energy installations at the nominal voltage, and (iii) a logic unit configured to connect the power-factor regulator and the additional regulator such that a common control signal is formed for the converter.

2. The wind farm of claim 1, wherein the logic unit has variable weighting factors for the power-factor regulator and the additional regulator.

3. The wind farm of claim 1, wherein the logic unit is designed such that the wattless component is varied linearly with the voltage in a voltage tolerance band and is varied non-linearly outside the limits of the voltage tolerance band.

4. The wind farm of claim 1, wherein the logic unit comprises an input filter having a characteristic element for the power-factor regulator or the additional regulator.

5. The wind farm of claim 1, wherein the farm master comprises a conversion module which has an input for a farm nominal voltage and whose output acts on a wattless-component monitor.

6. The wind farm of claim 1, further comprising a compensation module provided in the farm master to whose input the actual voltage is applied and whose output signal acts on a wattless-component monitor for compensation.

7. A wind energy installation designed as claimed in one of claims 1 to 6.

8. The wind farm of claim 1, wherein the power-factor regulator is connected to an emergency controller which produces a substitute value when there is no control signal for the wattless component from the farm master.

9. The wind farm of claim 8, wherein the substitute value is stored.

10. A wind energy installation comprising:

a generator with a converter for production of electrical power;

a controller with a connection for a communication network via which a control signal for a wattless component is applied to the wind energy installation;

wherein the controller comprises a power-factor regulator to whose input a wattless-component nominal value is applied and which acts on the converter to set the wattless component which corresponds to the wattless-component nominal value;

an additional regulator to whose input a signal for a nominal voltage is applied and which emits control signals for the converter to vary the emitted wattless component in order to regulate the emitted voltage from the wind energy installation at the nominal value; and a logic unit which connects the power-factor regulator and the additional regulator such that a common control signal is formed for the converter.

11. A method for operation of a wind farm, the wind farm comprising (i) at least two wind energy installations, each having a generator with a converter for production of electrical power and a controller, (ii), a farm master designed for real-power and wattless-component monitoring and configured to transmit a control signal for a wattless component via a communication network to the wind energy installations, and (iii) a connection grid system which connects the wind energy installations to feed the produced electrical power into a grid system via a junction point, the method comprising:

regulating the wattless component at at least one of the wind energy installations by a power-factor regulator of the controller to whose input a wattless-component nominal value is applied and which acts on the converter to set the wattless component;

applying a signal for a nominal voltage to the at least one wind energy installation;

regulating the emitted voltage by varying the wattless component emitted from the converter at the nominal voltage by an additional regulator of the controller; and linking the power-factor regulator and the additional regulator such that a common control signal is formed for the converter.

12. The method of claim 11, wherein the linking is carried out by variable weighting factors.

13. The method of claim 11, wherein the linking is carried out such that the wattless component is varied linearly with the voltage in a voltage tolerance band and is varied non-linearly outside the limits of the voltage tolerance band.

14. The method of claim 11, further comprising regulating the voltage at the junction point of the wind farm at a nominal value by a voltage control module which acts on a wattless-component monitor.

15. The method of claim 11, further comprising producing a pilot control signal for the nominal voltage as a function of the actual emitted voltage of the wind farm for compensation of the additional regulator.

16. The method of claim 11, wherein the linking is carried out by input filtering of the input signals for the additional regulator or the power-factor regulator.

17. The method of claim 16, wherein a characteristic element is used for input filtering.

* * * * *